July 1, 1941. M. R. HUTCHISON, JR 2,247,499
SCREW STICK
Filed Nov. 28, 1939 2 Sheets-Sheet 1
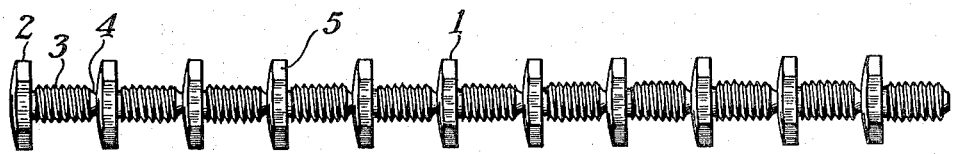
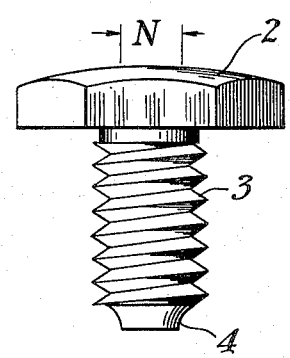
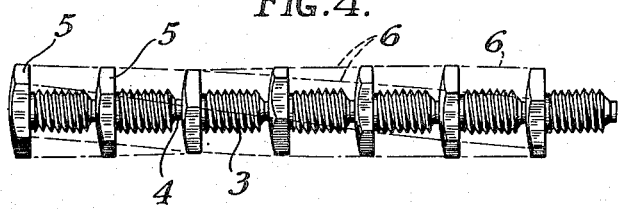
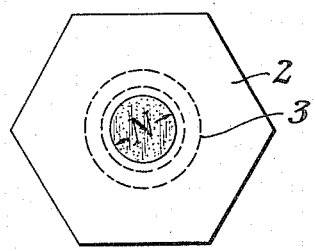
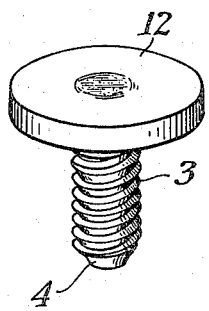
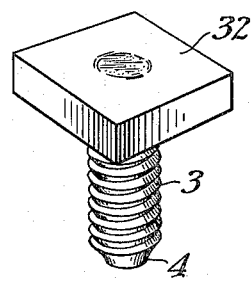
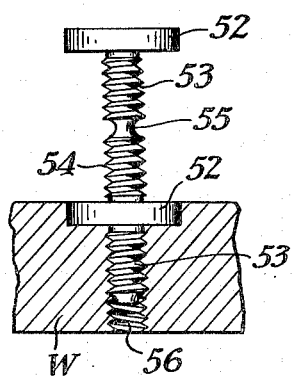
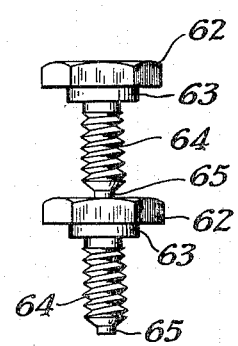
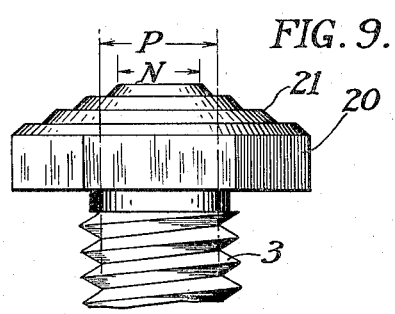
MILLER R. HUTCHISON, JR
INVENTOR
BY
ATTORNEYS July 1, 1941.  M. R. HUTCHISON, JR  2,247,499
SCREW STICK
Filed Nov. 28, 1939  2 Sheets-Sheet 2

MILLER R. HUTCHISON, JR.
INVENTOR

BY *Donald H. Stewart*
ATTORNEYS

Patented July 1, 1941

2,247,499

UNITED STATES PATENT OFFICE 2,247,499

SCREW STICK

Miller R. Hutchison, Jr., Rochester, N. Y., assignor to Eastman Kodak Company, Rochester, N. Y., a corporation of New Jersey Application November 28, 1939, Serial No. 306,504

6 Claims. (Cl. 85—41)

This invention relates to an article of manufacture comprising a series of integrally connected screws to facilitate placing such screws in threaded apertures.

One object of my invention is to provide a screw stick suitable for use in magazine screw drivers so that one screw after another may be rapidly driven into place. Another object of my invention is to provide a screw stick which consists of a plurality of screws connected by a frangible neck so that after a screw is driven into a threaded opening, the neck may be broken. Still another object of my invention is to provide a screw stick so that screws, and particularly screws of small size, can be easily handled, accurately positioned, and so that regardless of the torque applied to the screws, there will never be any danger of stripping the screw thread. Another object is to prevent a careless operator from incompletely tightening screws. Still another object is to provide a screw stick in which the screws may or may not have heads. Other objects will appear from the following specification, the novel features being particularly pointed out in the claims at the end thereof.

Coming now to the drawings wherein like reference characters denote like parts throughout:

Fig. 1 is a side elevation of a screw stick constructed in accordance with and embodying a preferred form of my invention.

Fig. 2 is an enlarged side elevation of a screw broken from the screw stick shown in Fig. 1.

Fig. 3 is a top plan view of the screw shown in Fig. 2.

Fig. 4 is a side elevation of a screw stick in which the polygonal heads of the screws are arranged in a spiral pattern.

Fig. 5 is a perspective view of a modified form of screw having a round, smooth head.

Fig. 6 is a view similar to Fig. 5, but showing a square-headed screw.

Fig. 7 is a side elevation partially in section, showing a doubled-ended screw, such as may be made in accordance with my invention.

Fig. 8 is a side elevation of a portion of a screw stick in which the screws are equipped with shoulders so that they may serve as studs.

Fig. 9 is an enlarged side elevation of a screw having a series of concentric formings on the head.

Figure 10:
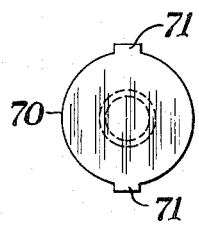
Fig. 10 is a top plan view of a screw with modified form of head.

In placing screws into work, a large part of the time of the operation is consumed by picking up the screw, entering the blade of the screw driver in the slot, and positioning the screw in the aperture. In addition, after such a screw has been properly seated, it is always difficult for an operator, particularly when extremely small screws, such as are used in watches and photographic shutters, are concerned, to determine just how much force to apply to a screw driver to seat the screw firmly without stripping the threads.

In accordance with my invention, I have provided an integral screw stick which consists of a plurality of screws, each screw having a head, a threaded shank and a narrow frangible neck connecting the threaded shank of one screw to the head of the next adjacent screw, so that in using these screws the screw which is entered into the work may be turned by the next adjacent screw or a succeeding screw until it is properly seated, after which continued movement of the remainder of the screw stick in a rotative direction will snap the neck off adjacent the screw head which has been placed in the work. In this way, the torque applied to each screw being seated in its tapped aperture is always dependent on the strength of the neck of the screw stick so that all screws will be properly seated.

In addition, such screw sticks may readily be used in magazine screw drivers and in automatic screw applying machines, a preferred example of a magazine screw driver being shown in my copending application Serial No. 306,505, filed November 28, 1939.

In Fig. 1, a typical screw stick is shown, although I prefer to make more screws on the stick, particularly in the case of small screws, than are shown in this figure, which is on a greatly enlarged scale. The screw stick designated broadly as 1 is here shown as being made from a piece of stock hexagonal in cross-section so that each screw head 2 is hexagonal in shape. Each screw has a threaded shank 3 and a narrow neck 4 connects the end of one threaded shank to the next adjacent screw head. In manufacture, the size of this neck is carefully determined so that it will have sufficient strength to drive the screw firmly home and so that continued rotative or bending movement of the stick relative to the seated screw will cause the neck to snap off.

As indicated in Figs. 2 and 3, the area N of the neck can be made to break off very close to the surface of the screw head 2, and this break does not necessarily leave a roughened surface, or a surface which is in any way objectionable, particularly where the screw heads are concealed inside of shutter or watch mechanisms.

I have found that if a screw head, as indicated in Fig. 9 at 20, is provided with a series of ring-like formings 21, the broken area of the neck N is scarcely noticeable at all, particularly if the screw stick is broken from the seated screw by a slight change of the angle of the screw stick relative to the axis of the driven screw, which may be made while the screw stick is still being turned to seat the driven screw. With the necks of the shape shown in Fig. 1, a relatively clean and smooth break can be obtained.

Experiments have shown that the break-off will be rough and stand up appreciably from the seated screw head if the fracture is produced wholly by bending. The smooth break desired results from failure of the section in torsion, which causes the material to shear off, although there is present some bending due to axial misalignment. How much the bending amounts to is not accurately known but it is considered that the principal stress is shear due to torsion.

The screw stick may be provided with a series of screw heads 2 as shown in Fig. 1, in which the flat surfaces 5 are all arranged in a plane with the flat surfaces of the other screws, or, in accordance with Fig. 4, the flat surfaces 5 may be formed in a spiral which may be accomplished by having the edges 6 of the hexagonal stock twisted in spiral form. Both of these forms have certain advantages, since they may be made to cooperate with an internal opening in a screw driver particularly designed to receive the stick of screws.

It is obvious that the screws may assume many different forms, and I have shown only a few of these forms in the drawings.

In Fig. 5, the screw head 12 is shown as being of cylindrical shape, the threaded area 3 and the neck 4 being the same general design as the screws shown in the preceding figures. The screw in Fig. 6 is like the screw in Fig. 5, except that it carries a square head 32.

In Fig. 7, a double-ended screw is shown which may have a smooth head 52, a threaded shank 53 and a neck 55 between a second threaded section 54 and the head 52. Such double-ended screws are useful where it is desirable to thread one shank 53 into a tapped opening 56 in the work W, permitting a threaded shank 54 to project upwardly therefrom for the reception of a nut.

In Fig. 8, a screw, in the form of a shoulder stud, is shown. In this type of screw stick, each screw consists of a multi-sided head 62, a shoulder 63, a threaded shank 64, and a neck 65 connecting the end of the threaded shank to the next adjacent screw head.

In Fig. 9, I have shown an enlarged side elevation of a preferred type of screw head 20, which may be provided with a series of ring-like formings 21 which form decorative circles on the top of the screw head and which render the neck portion N, which is broken from the next adjacent threaded screw shank 3, less noticeable than it would otherwise be.

Figure 11:
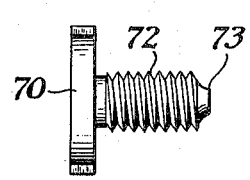
Fig. 11 is a side elevation of the screw shown in Fig. 10.

In Figs. 10 and 11, I have illustrated a screw having a substantially round head 70 from which lugs 71 extend outwardly to engage the special screw-driving member which is used with screw sticks of this type. This screw has the usual threaded shank 72 and narrow neck 73 which connects one end of the threaded shank to the next adjacent screw head 70.

Figure 12:
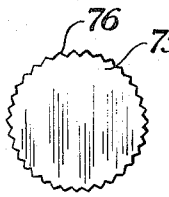
Fig. 12 is a top plan view of another modified form of screw head.
Figure 13:
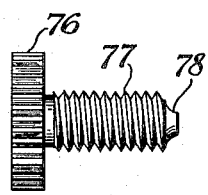
Fig. 13 is a side elevation of the screw shown in Fig. 12.

Figs. 12 and 13 show a screw having a head 75 serrated as at 76, this screw having a threaded shank 77 and a narrow neck 78 connecting the threaded shank to the next adjacent screw head.

Figure 14:
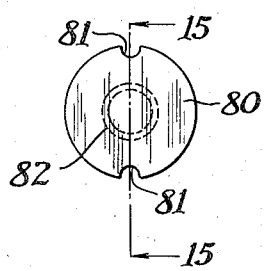
Fig. 14 is a top plan view of another form of screw head.
Figure 15:
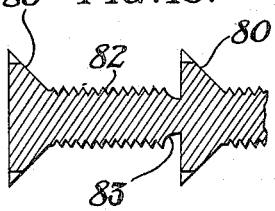
Fig. 15 is a section in line 15—15 of Fig. 14.

Figs. 14 and 15 illustrate a substantially round screw head 80, having notches 81 in the periphery for engaging the screw-driving member and a threaded shank 82 with a narrow neck 83, connecting the threaded shank to the next screw head 80.

In this particular form of screw, the head is of the "flat-head" type, except that the head 80 does not, of course, carry the usual slot for the screw driver, but instead is provided with the notches 81.

Figure 16:
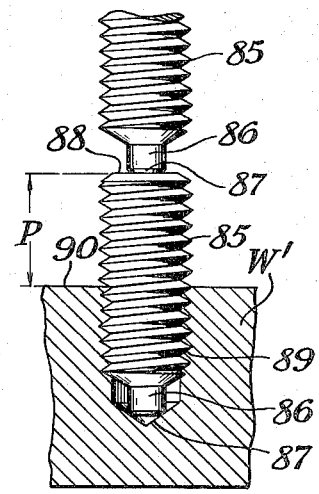
Fig. 16 is a side elevation of a headless screw, driven into a complementary tapped opening.

In Fig. 16, a headless screw 85 is shown, the threaded shank of which is connected to the next adjacent threaded shank by a neck 86 which may be narrowed down at 87 adjacent the upper edge 88 of the next headless screw 85. The reason for the shank 86 in this instance is that in some cases where it is desirable to have a screw project from work W', it is desirable to turn the threaded shank 85 into a threaded opening 89 in the work until the shank 86 reaches the bottom 87 of the drilled aperture which can be carefully controlled in depth. Thus, that portion of the screw P which projects above the upper surface 90 of the work will always project a known distance and may be in position to receive threaded nuts or other parts.

When such headless screws, as shown in Fig. 16, are employed, or when a smooth-headed nut, as shown in Figs. 5 and 7, are employed, it is necessary to use a screw driver having a friction grip which will hold this screw head sufficiently tightly to drive it into the work and to continue the rotative movement until the neck between the screws is broken.

The above figures show a series of different forms of screws which lend themselves particularly to the form of screw sticks, but it is obvious that the screws may be made in practically every shape of a normal screw or stud, except that a series of these screws are always formed in one piece of metal so that there is a substantial rod or stick to handle.

When screws are produced in the form of screw sticks, they are not only easy to pick up, to apply to work, to seat firmly in work, but they are particularly suitable for use in screw-driving machines and in screw drivers. There is never the difficulty of endeavoring to pick up a single small screw so that the screws may be much more rapidly applied than is the case with the usual individual screws. Obviously, various size screws can be made in accordance with my invention, but I have found that screw sticks composed of screws one-eighth of an inch and less in length are particularly useful, because it is these smaller screws that are the most difficult to handle. I do not, however, wish to limit myself to any size or shape of screw, since the dimensions and form may vary widely in accordance with the particular work which is to be accomplished.

It will be noticed that the narrow necks 4 between the threaded shank of one screw and the head of the next adjacent screw are not greater in diameter than the root diameter of the threaded shank, so that the neck will always break before a torque sufficient to rupture the body of the screw can occur. Consequently, when screws in stick form are applied to work even by inexperienced operators, tightening is limited automatically to a safe value. Should the screw jam in the work before reaching its fully seated position, forcing it will separate it from the driver before the work is damaged. The separated screw does not lose its head under these conditions and readily may be extracted by applying to it a suitable wrench and backing it out.

Correct alignment of the screw with the tapped hole at the outset is easily secured, even with the smallest screws which are very difficult to align when handled individually, for this may be judged by the alignment of the stick and driver.

The diameter of the frangible portion of the screw stick being less than the root diameter of the threads provided, rupturing of those portions does not impair the threads adjacent thereto.

The driver screw being attached mechanically to the driver during the operation, the driving tool is prevented from disengaging from it and damaging the adjacent surface of the work or marring the head of the screw, both of which occurrences have been common heretofore.

I claim:

1. A screw stick comprising a plurality of screws coaxially arranged, each screw including a multi-sided head and a threaded shank carried by the head, a breakable neck connecting adjacent screws, the multi-sides of the heads of said screws being positioned in non-parallel relation.

2. A screw stick comprising a plurality of screws coaxially arranged, each screw including a multi-sided head and a threaded shank carried by the head, a breakable neck connecting adjacent screws, the multi-sides of the heads being arranged in a spiral from one end of the screw stick to the other.

3. A screw stick including a plurality of integrally connected screws, each screw comprising a head, a plurality of ring like formations thereon, a threaded shank directly adjacent the head, and a neck of smaller diameter than the threaded shank connecting the threaded shank to the next adjacent screw head near the ring-like formations thereon whereby when one screw is broken from the stick the ruptured end of the neck at the head of the screw is at least less noticeable.

4. A screw stick for use as a unit in applying one screw of the screw stick to work by a force applied to another screw of the stick and comprising a plurality of integrally connected coaxially arranged screws, each screw including a torsional driving head, a threaded portion and a neck connecting a threaded portion of one screw to the next adjacent torsional driving head of the next screw of the stick, the neck portion being so proportioned relative to the threaded portion of the screw that said neck portion may be broken when said screw thread is properly seated in a complementary threaded aperture.

5. A screw stick for use in the direct application of individual screws to work and comprising an integral stick of screws, each screw including a torsional driving head of non-round shape, a threaded portion adjacent said head, a neck of less diameter than said threaded portion connecting the threaded portion with the next adjacent torsional driving head, whereby one screw may be screwed into work by another screw head of a screw integral therewith by a torque applied to the screw through the narrow neck, said torque first seating and then breaking the narrow neck.

6. A screw stick for use in the successive application of one end screw after another of the stick to work and comprising an integral stick of screws, each screw arranged in axial alignment and having a torsional driving head, a threaded area adjacent the head, a frangible neck adjacent the threaded area having less torsional strength than the remainder of the screw, said frangible neck also lying adjacent and being connected to the next torsional driving head of the next screw of the screw stick, whereby an end screw of the screw stick may be driven into work by the torsional driving head of another screw of the screw stick by applying a torque to the screw entering the work through the frangible neck until the screw is seated and the neck broken, the strength of said frangible neck controlling the torque applied to the screw passing into the work.

MILLER R. HUTCHISON, Jr.